United States Patent
Rowan

(10) Patent No.: US 7,332,832 B2
(45) Date of Patent: Feb. 19, 2008

(54) REMOVABLE HARD DISK DRIVE (HDD) THAT IS HOT-PLUG COMPATIBLE WITH MULTIPLE EXTERNAL POWER SUPPLY VOLTAGES

(75) Inventor: Bryan S. Rowan, San Jose, CA (US)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 395 days.

(21) Appl. No.: 10/788,911

(22) Filed: Feb. 27, 2004

(65) Prior Publication Data

US 2005/0200998 A1 Sep. 15, 2005

(51) Int. Cl.
*H02J 1/10* (2006.01)
(52) U.S. Cl. .................................. 307/43
(58) Field of Classification Search .............. 307/43
See application file for complete search history.

(56) References Cited

U.S. PATENT DOCUMENTS

| | | | |
|---|---|---|---|
| 4,163,278 A | 7/1979 | Onoue et al. | |
| 5,210,660 A | 5/1993 | Hetzler | |
| 5,285,327 A | 2/1994 | Hetzler | |
| 5,315,468 A | 5/1994 | Lin et al. | |
| 5,353,181 A | 10/1994 | Frater et al. | |
| 5,438,559 A | 8/1995 | Best et al. | |
| 5,440,474 A | 8/1995 | Hetzler | |
| 5,465,186 A | 11/1995 | Bajorek | |
| 5,500,848 A | 3/1996 | Best et al. | |
| 5,526,211 A | 6/1996 | Hetzler | |
| 5,615,190 A | 3/1997 | Best et al. | |
| 5,777,825 A | 7/1998 | Dorius | |
| 5,798,573 A | 8/1998 | Saganovsky | |
| 5,821,717 A | 10/1998 | Hassan et al. | |
| 5,877,611 A | 3/1999 | Brkovic | |
| 5,959,439 A * | 9/1999 | Shenai et al. | 323/222 |
| 6,150,798 A | 11/2000 | Ferry et al. | |
| 6,327,635 B1 * | 12/2001 | Alston et al. | 710/301 |
| RE37,738 E | 6/2002 | Brkovic | |
| 6,650,096 B2 * | 11/2003 | Lee | 323/272 |

FOREIGN PATENT DOCUMENTS

JP 10-066377 6/1998
WO WO 01/89070 A1 11/2001

OTHER PUBLICATIONS

"5V and 12V Spindle and VCM Motors Driver," product review STMicroelectronics Geneva, Switzerland (2001).
"IBM Family of Microdrives," product information IBM Corporation San Jose, CA (2000).
"Synchronous Rectification Aids Low-Voltage Power Supplies," product information Maxim Integrated Products, Sunnyvale, CA (2003).

* cited by examiner

*Primary Examiner*—Michael Sherry
*Assistant Examiner*—Carlos Amaya
(74) *Attorney, Agent, or Firm*—Townsend and Townsend and Crew LLP; Patrick Duncan

(57) ABSTRACT

Circuitry in a hard disk drive (HDD) senses the supply voltage, normally at power-on, and applies appropriate DC-to-DC conversion (pass-through, step-down, or boost regulation) according to the design requirements of the HDD.

23 Claims, 5 Drawing Sheets

States of Output Signals Out1, Out2, and Out3 for Different Combinations of Vcc, Vcc'(1), and Vcc'(2)

| Vcc | Vcc'(1) | Vcc'(2) | Out1 | Out2 | Out3 |
|---|---|---|---|---|---|
| 5V | 5V | 5V | On | Off | On |
| 5V | 5V | 12V | On | Switch | Off |
| 12V | 12V | 12V | On | Off | On |
| 12V | 5V | 12V | Switch | Off | On |

States of Output Signals Out1, Out2, Out3, and Out3
for Different Combinations of Vcc and Vcc'

| Vcc | Vcc' | Out1 | Out2 | Out3 | Out4 |
|---|---|---|---|---|---|
| < Vcc' | > Vcc | On | Switch | Off/Switch | Off |
| = Vcc' | = Vcc | On | Off | On | Off |
| > Vcc' | < Vcc | Switch | Off | On | Off/Switch |

REMOVABLE HARD DISK DRIVE (HDD) THAT IS HOT-PLUG COMPATIBLE WITH MULTIPLE EXTERNAL POWER SUPPLY VOLTAGES

BACKGROUND OF THE INVENTION

The present invention relates generally to devices or modules that are incorporated into larger systems and rely on power from another system component's power supply. The invention relates more specifically to techniques for providing power to such devices or modules. Most of the discussion will concentrate on the example of hard disk drives (HDDs) that rely on power from a host.

While HDDs are constantly improving in terms of capacity, performance, and price, they still represent a significant portion of the system cost, and therefore it may be desired to re-use a HDD in a system that is different from that in which the HDD was previously deployed. For example, while a computer system may have become unusable for one or another reasons, the system's HDD may find utility in a spare drive bay in a different desktop system or in an enclosure for use as an external drive.

Unfortunately, as HDD technology has evolved, different form factors have come on the scene, and a HDD removed from one system may not easily fit in another. If the HDD is too large for the desired destination drive bay, the only resort is to put the HDD in an external enclosure. However there have been solutions for the case where the HDD is too small. For example, one existing solution uses a drive carrier to adapt a small form factor to a larger drive bay.

An additional problem may arise if the voltage or voltages provided by the new host differ from those required for the HDD. For example, a mobile drive will often be designed to operate only from a single, external 5-volt supply. A small form factor server drive, however, may use 5 volts for circuitry and 12 volts for motor control, or a single, external 12-volt supply in some emerging applications. This problem has been addressed by power supply adapters that provide one or more DC-to-DC converters or voltage regulators to step voltages up or down.

At this point, the re-use of the HDD may have become uneconomical, since the cost of a separate enclosure or a drive carrier and voltage adapter may exceed the cost of a comparable or better new HDD with the appropriate form factor and voltage requirements. The destination for the old HDD now becomes the county landfill.

SUMMARY OF THE INVENTION

In one aspect of the present invention, a circuit senses an input supply voltage and provides a desired output voltage. The circuit includes a voltage sensing circuit, a control circuit, and a switching element. The voltage sensing circuit is configured to sense, at least at a predetermined time (such as power-on), a value of the input supply voltage and provide a voltage indication signal based on the supply voltage, so sensed. The control circuit is responsive to the voltage indication signal, and generates a control signal that is applied to a control terminal of the switching element. The control signal is different for different first and second values of the supply voltage, so sensed. For the first value of the supply voltage, so sensed, being different from the desired output voltage, the control signal is in the form of a pulse train for switching the switching element. The switching element is preferably a component of a DC-DC conversion circuit that provides the desired output voltage. The circuit may include an additional switching element, which may be a component of an additional DC-DC conversion circuit or may form a controllable pass-through path. The desired output voltage may be used to power motors and logic in a hard disk drive. In one embodiment, the voltage connector is a two-pin connector that can connect to different input supply voltages, or to a widely varying input supply voltage.

In another aspect of the present invention, a circuit for powering a hard disk drive includes a voltage sensing circuit, at least one DC-DC conversion circuit, and a control circuit. The voltage sensing circuit is configured to sense, at least at a predetermined time, a supply voltage at an input node and provide a voltage indication signal based on the supply voltage, so sensed. The DC-DC conversion circuit is connected to the input node and to an output node, and can convert the supply voltage, so sensed, to a different desired output voltage and provide the different voltage on the output node. The control circuit is coupled to the voltage sensing circuit and to the DC-DC conversion circuit, and controls the DC-DC conversion circuit depending on the supply voltage, so sensed.

In another aspect of the present invention, a circuit for powering a hard disk drive includes a voltage sensing circuit, at least one DC-DC conversion circuit, a switchable pass-through path between an input node and an output node, and a control circuit, coupled to the voltage sensing circuit, the DC-DC conversion circuit, and the switchable pass-through path. The voltage sensing circuit is configured to sense, at least at a predetermined time, a supply voltage at the input node and provide a voltage indication signal based on the supply voltage, so sensed. The DC-DC conversion circuit is connected to the input node and to the output node, and can covert the supply voltage, so sensed, to a different desired output voltage and provide the different voltage on the output node.

The control circuit is coupled to the voltage sensing circuit, the DC-DC conversion circuit, and the switchable pass-through path, and controls the DC-DC conversion circuit and the switchable pass-through path in the following manner. When the voltage indication signal indicates that the supply voltage is different from the desired output voltage, the control circuit enables the DC-DC conversion circuit to supply the different voltage on the output node, and prevents the pass-through path from passing the supply voltage to the output node. When the voltage indication signal indicates that the supply voltage is equal to the desired output voltage, the control circuit prevents the DC-DC conversion circuit from supplying the different voltage on the output node, and allows the pass-through path to pass the supply voltage to the output node.

A further understanding of the nature and advantages of the present invention may be realized by reference to the remaining portions of the specification and the drawings.

DESCRIPTION OF SPECIFIC EMBODIMENTS

The present invention finds particular applicability to the powering of hard disk drives (HDDs) from host power supplies, but can be used in other contexts such as other types of disk drives (e.g., drives with removable media such as CD and DVD drives). The invention also can be used for other devices or modules that are incorporated into a system and rely on power from other system components.

Structure of a Conventional HDD System

Figure 1A:
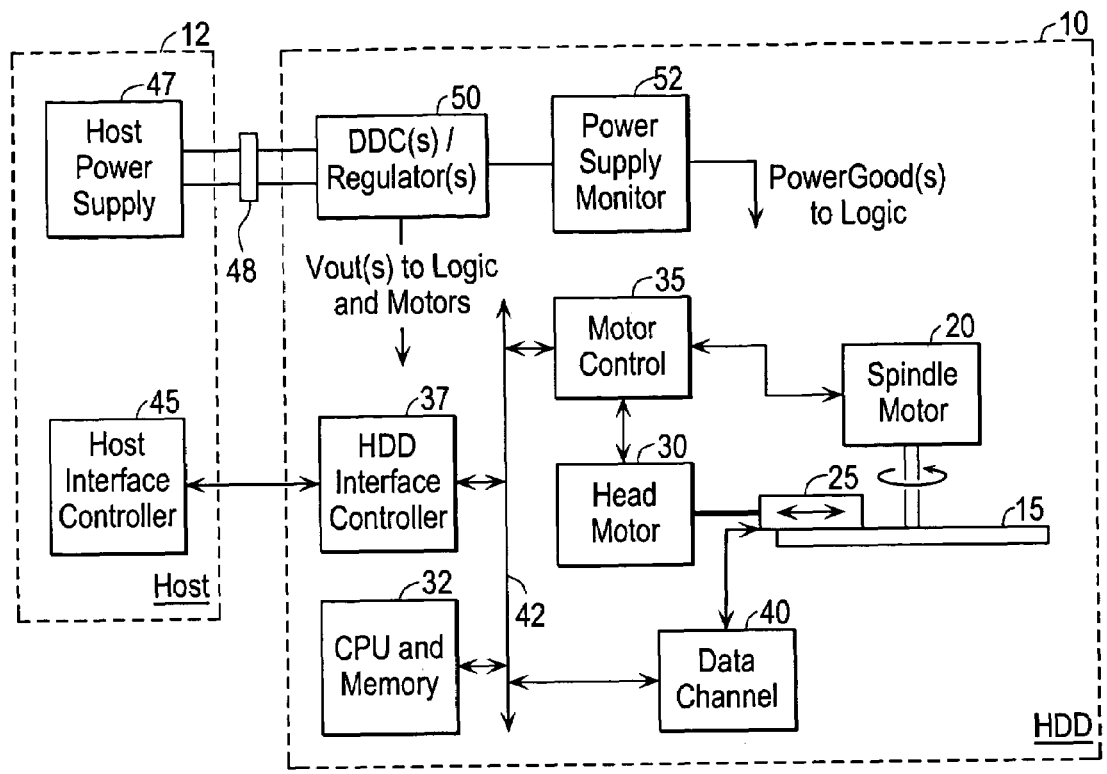
FIG. 1A is a block diagram of a conventional system for powering and controlling a hard disk drive (HDD) from a host system.

FIG. 1A is a block diagram of a convention hard disk drive (HDD) 10 and a host system 12. At the heart of the HDD is a mechanism that includes one or more disks 15 (also referred to as platters; only one disk is shown) that are rotatably driven by a spindle motor 20. Disk 15 is coated on one or both sides with a magnetic material for storing user data and position information on a plurality of concentric tracks. Data is written to and read from a given side of disk 15 by a read-write head 25 (referred to simply as head 25) that is driven reciprocally along a radial direction by a head motor 30. (More precisely, head motor 30 typically effects a rotary motion so that head 25 is driven along an arcuate path that is generally radial with respect to the disk). Most modern HDDs (except the very smallest) have a plurality of disks, and therefore have a corresponding plurality of heads (one head per side per disk), which are normally moved in unison. Some HDDs also have multiple heads per side per disk.

A CPU 32 (shown with associated memory and represented as a single block) provides the overall data processing control over the HDD. CPU 32 communicates with motor control circuitry 35, a HDD interface controller 37, and a data channel 40. The communication paths are shown schematically as occurring over a bus 42, but this is merely for representation. Some of the communication paths may be point-to-point following protocols appropriate for the environment. The CPU may include a microprocessor or microcontroller, combinatorial logic, or a combination. The block may also include one or more DSPs and the like for encoding and decoding data. While the CPU and memory are shown as a single block, it should be understood that the CPU functionality may be distributed, and certain tasks carried out by other elements in the HDD.

Motor control circuitry 35 typically includes a servo and motor drivers, and is responsible for positioning head 25 at desired positions on disk 15, and for maintaining the rotational speed within specified limits. The HDD's mechanical elements and the spindle and head motors provide feedback signals. Therefore, the communication links between motor control circuitry 35 and motors 20 and 30 are shown as bi-directional links to indicate that signals are flowing to the motors and that feedback signals are flowing back. The particular manner in which the control signals are generated to drive the head to the correct track and rotate the disk to the correct sector are not part of the invention and will not be described further.

Data channel 40 is responsible for converting digital signals representing data from the memory to signals that cause head 25 to actually write data onto disk 15, and also for converting analog signals picked up by the head during read operations into a digital format that can be stored in the memory. The data channel is also responsible for writing this data to the memory and reading data, from the memory. HDD interface controller 37 is responsible for communication with a host interface controller 45 in host system 12. The interface protocol may be any suitable protocol, with ATA, IEEE 1394 (Firewire), SSA, SCSI, USB, and Fiber Channel being some examples of buses that may be used.

A host power supply 47 provides one or more nominally fixed supply voltages (referred to as Vcc) to HDD 10 (5 volts and/or 12 volts is typical) through a connector 48. To manage and distribute this power, HDD 10 includes one or more voltage regulators and/or DC-DC converters (DDCs), shown schematically as a DDC/regulator block 50. The element or elements that constitute block 50 provide one or more voltages Vout that are required by the above described circuitry and motors. These voltages may be, and often are, different from the voltage or voltages supplied by host power supply 47. Some representative voltages that may be derived from Vcc are: 3.3 volts for memory and I/O circuits; 2.5 volts for memory, I/O circuits, core logic and ASICs; 1.2 volts, 1.5 volts, or 1.8 volts, depending on the particular CMOS circuitry in HDD 10; ±5 volts for differential preamplifiers; 8 volts or 10 volts for single-ended preamplifiers; and the list goes on.

At this point, it is noted that there is a lack of uniformity in the art relating to the nomenclature applied to devices that change one DC voltage to another. To some the term "DC-DC converter" requires some sort of switching to take place. The term "switching regulator" would thus be synonymous, while the term "voltage regulator" would be considered generic so as to include switching and non-switching regulators. To others, the term "voltage regulator" implies a non-switching or linear regulator, and the terms "voltage regulator" and "DC-DC converter" would be mutually exclusive. In order to avoid confusion, the term "DC-DC conversion circuit" as used in this application should be taken in the broadest sense, to include any device that converts one DC voltage to another, whether or not it entails a switching operation.

A power supply monitor 52 monitors the various supply voltages, compares them to one or more reference voltages, and provides one or more output signals, referred to as PowerGood signals, that are communicated to various of the other circuits. The PowerGood signal(s) specify whether the supply voltage(s) Vout(s) are within acceptable limits. If they are, one set of operations is permitted; if a supply voltage is outside acceptable limits, a different set of operations is permitted, or perhaps mandated. One feature of prior art disk drive power management circuitry is the ability to safely park disk head 25 away from the active regions of disk 15 when power is lost, either due to intended powering down of the disk drive or due to catastrophic power failure.

The voltages required for the HDD are determined by the particular circuit technologies in use on the HDD circuit board, and will presumably change as circuit technologies evolve. However, the specific required voltages are known a priori and are taken into account in designing DDC/regulator block 50 and power supply monitor 52.

Figures 1B, 2B:
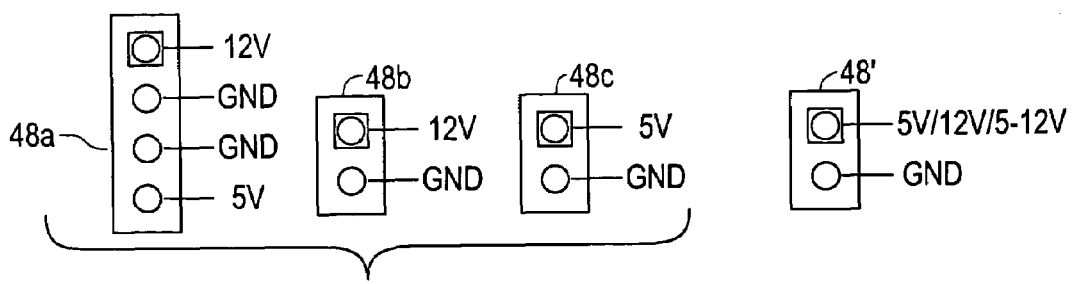
FIG. 1B provides schematic showing three prior-art connectors that can be used to connect a host power supply to a HDD.
FIG. 2B is a schematic showing a connector that can be used in connection with one or more embodiments of the invention.

FIG. 1B shows three conventional connectors, designated 48a, 48b, and 48c, having pin arrangements that are typical in prior art systems. Connector 48a is for a standard two-voltage (12 volts and 5 volts) HDD power connection as found in many personal computers and servers. Connector 48b is for a standard one-voltage (5 volts) HDD power connection as found in many laptops and mobile devices. This connection is often integrated into the bus connection. Connector 48c is for a proposed one-voltage (12 volts) small form factor HDD power connection for servers, also integrated into the bus connection.

Overview of Self-Configuring Power System

Figure 2A:
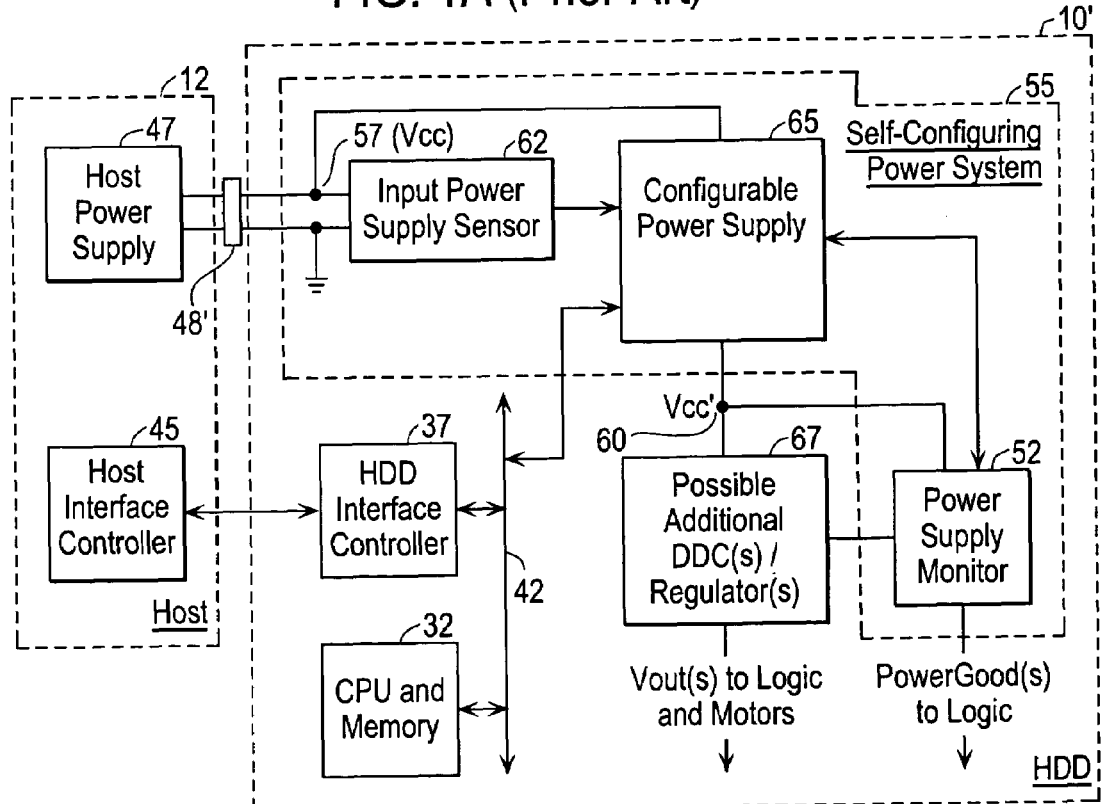
FIG. 2A is a block diagram showing how a self-configuring power system can be deployed in an otherwise conventional HDD in an embodiment of the present invention.

FIG. 2A is a block schematic showing the manner in which embodiments of the invention may be deployed within a HDD, designated 10' since it is different from HDD 10 of FIG. 1A. Elements corresponding to those in FIG. 1A will use the same reference numbers. Since the invention is drawn to techniques for managing the power supplied to the HDD, only the relevant portions of the HDD circuitry will be described. Again, the figure shows HDD 10' in communication with host 12 having host power supply 47 from which the HDD receives power through a connector 48'. The host may be a computer, a drive enclosure, or any system or subsystem that is expected to provide power to HDD 10'.

In one aspect, the present invention allows HDD 10' to obtain power for its operation without being limited to a single supply voltage from host power supply 47. By way of illustration, server and enterprise systems typically provide 5 volts and 12 volts (with 12 volts only coming into use), laptop computers and other portable hosts typically provide 5 volts, and personal computers typically provide 5 volts and 12 volts. In some embodiments, a self-configuring power system 55 senses the voltage level Vcc on a voltage supply node 57 (i.e., the voltage from the host power supply), determines a required supply voltage, and performs voltage conversion to provide the required voltage level Vcc' on a voltage supply node 60.

Self-configuring power system 55 includes an input power supply sensor 62 and a configurable power supply 65. A power supply monitor, corresponding generally to power supply monitor 52 in FIG. 1A, is shown as part of self-configuring power system 55 because in some embodiments it performs additional functions to those performed by the prior art power monitor. However, some embodiments may rely on pre-existing supply monitoring rather than providing separate supply monitoring.

At power-on, input power supply sensor 62 determines the voltage from the host power supply, and provides one or more relevant voltage indication signals to configurable power supply 65. Input power supply sensor 62 could include a set of voltage reference sources (e.g., ground, a bandgap, or another known value). The sensed voltage (or one or more scaled versions, thereof) would be compared to one or more of the voltage references. Scaled voltages could be provided by a resistor divider between the sensed voltage and a reference such as ground, a bandgap, or another known value. The comparator outputs provide PowerGood signals representing whether the sensed voltage is above a given threshold for one of the possible expected values of Vcc. More flexible sensing could be achieved using D/A converters to provide reference voltages against which to compare the supply. The tradeoff is complexity and time to initialize. Such voltage sensing techniques are well known to those skilled in the art, and will not be described further.

Configurable power supply 65 receives the voltage indication signal(s) from input power supply sensor 62, and uses this information as well as other possible information to perform the necessary voltage conversion (pass-through, step-down, or boost regulation) as a function of Vcc and the HDD needs. Configurable power supply 65 is also shown as being in two-way communication with power supply monitor 52 and with bus 42. These communication paths are not necessary to practice the invention in its broader aspects, and in some embodiments, the communication over one of these links may be only be in one direction or the other. Some of these possibilities will be discussed below.

The drawing also shows possible additional DDC(s) and/or regulator(s) in recognition of the fact that HOD may need more than the voltage Vcc' provided by configurable power supply 65 in self-configuring power system 55. Some possible additional voltages, as discussed above, may be needed and their validity monitored by power supply monitor 52.

For example, depending on system and physical design limitations (related to magnetics, current limits, and the like), it might be preferred to regulate to 1.2 volts from 5 volts rather than regulating down directly from 12 volts. Thus, an internal DC-DC conversion circuit might be chosen to run from another internally-generated voltage. This would typically include cost, size/space/volume, power dissipation, and efficiency tradeoffs.

FIG. 2B shows an implementation of connector 48' suitable for one or more embodiments of the present invention. While the invention is not limited to any specific type of connector, a preferred embodiment of the invention utilizes a common, single two-pin external power supply connection compatible with both 12-volt and 5-volt systems. Other embodiments are possible, but could add complexity. While the power supply connection to the HDD and the host interface controller bus connection to the HDD are shown as separate connections, this is not necessary. By adopting a universal two-pin connection for power, some embodiments could use two pins on the bus for power.

Specific Embodiments of Configurable Power Supply

In this section, four embodiments of configurable power supply 65 are described for the specific example where the supply voltage Vcc can be 5 volts or 12 volts. Reference numbers corresponding to those in FIG. 2A will be used, but alphanumeric suffixes will be used to differentiate the different embodiments.

Figure 3A:
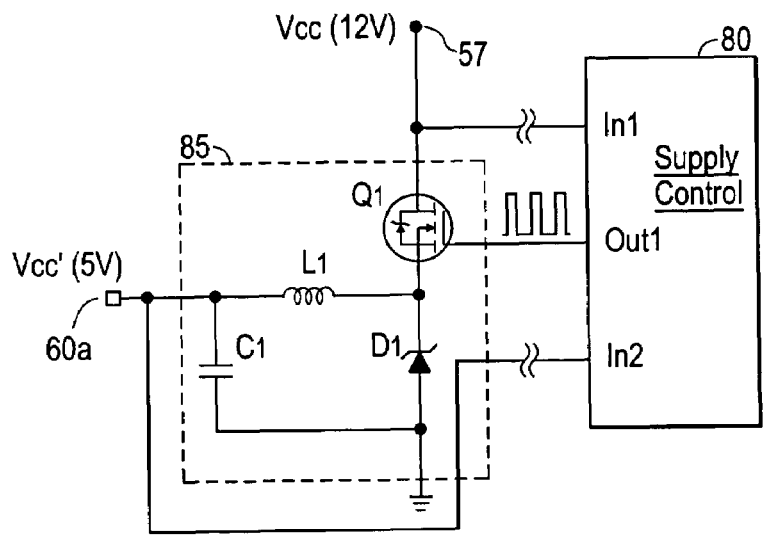
FIGS. 3A and 3B are circuit schematics of a first embodiment of a configurable power supply.
Figure 3B:
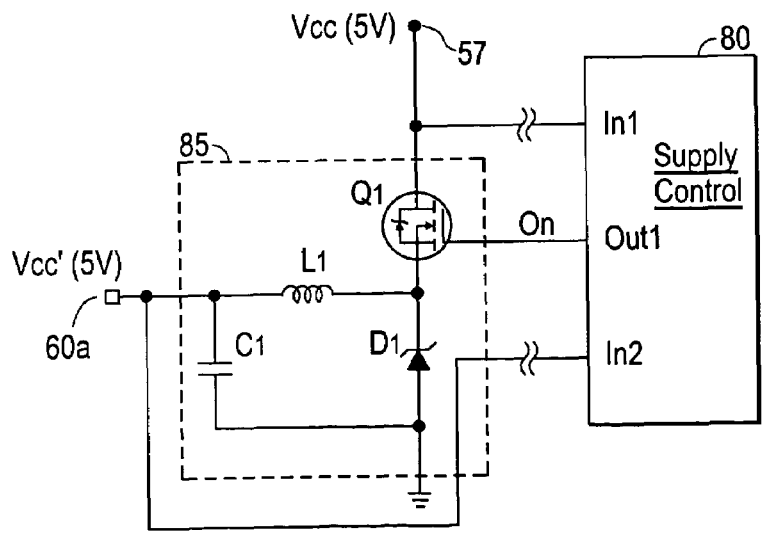

FIGS. 3A and 3B are circuit schematics of a configurable power supply 65a according to a first embodiment of the invention. In this embodiment, the system automatically senses whether the supply voltage Vcc on voltage supply node 57 is 12 volts or 5 volts, and provides a regulated 5-volt output on an output supply node 60a. Configurable power supply includes a supply control circuit 80 and a buck converter 85. There is nothing fundamentally preventing passing Vcc through in addition to providing the 5-volt output if this might be desirable for a particular design.

The supply control circuit is shown as receiving voltage levels Vcc from voltage supply node 57 and Vcc' from voltage supply node 60a at respective first and second inputs labeled In1 and In2. The connections are shown as broken by two S-shaped transverse lines as a stylized representation of the possibility that the connections can be indirect or direct as follows. An indirect connection to the power supplies is where the input power supply sensing and power supply monitoring functions would be performed by separate entities, such as input power supply sensor 62 and power supply monitor 52 as shown in FIG. 2. Alternatively, the connections to the voltage nodes can be direct, and voltage sensing and monitoring can be performed by supply control circuit 80. It is noted that supply control circuit 80 requires power, and this could come from at least Vcc, and possibly also from Vcc'.

Buck converter 85 comprises a switching element such as a transistor Q1, a diode D1 (which may be a Schottky diode, or another transistor working in synchronization with Q1 to reduce diode conduction losses), an inductor L1, and a capacitor C1. The transistor may be a metal-oxide-semiconductor field effect transistor (MOSFET), and is illustrated as such. However, this is but a single example of possible switching elements (e.g., JFET, bipolar transistor, BiCMOS transistor, IGBT). For convenience, the switching element in this embodiment, as well as switching elements in embodiments to be described below, will be referred to as transistors. An output terminal Out1 of supply control circuit 80 is coupled to the gate of transistor Q1. The remaining portions of the buck converter include the inductor and capacitor connected in series between the source of transistor Q1 and ground with the diode reverse biased between the source and ground.

FIG. 3A shows the situation where Vcc is determined to be 12 volts. In this case, supply control circuit 80 drives its output terminal Out1 with a square wave to produce a waveform across diode D1 whose average value is approximately the desired output voltage, in this instance 5 volts, and is provided as an output on voltage supply node 60a. When Q1 is off, the inductor current circulates through diode D1, which operates as a freewheeling diode. Since the required value of inductor L1 is approximately inversely proportional to the switching frequency, a relatively high switching frequency (e.g. 100 Khz or greater) is preferred. The body diode of the transistor is always reversed biased and does not conduct.

FIG. 3B shows the situation when Vcc is determined to be 5 volts. In this case, supply control circuit 80 provides an output on its output terminal Out1 that keeps transistor Q1 on. Thus the transistor acts as a pass transistor, and the 5 volts is provided as an output on voltage supply node 60a. Alternatively, if it is determined that the desired voltage is other than 5 volts, e.g., 3.3 volts, supply control circuit would drive output terminal with a square wave having a duty cycle that would step the 5 volts down to 3.3 volts.

While this embodiment uses a switching regulator, i.e., a buck converter, a step-down could also be achieved with a linear regulator. Switching regulators are more costly than linear regulators, primarily due to the cost of the diode and inductor, but are characterized by lower power consumption. For desktop systems, where battery life is not a concern, the cost saving may be warranted under some circumstances. If a linear regulator is used, a separate bypass path could be provided. A bypass path would not be required if supply control circuit were designed to keep transistor Q1 operating in the linear region instead of being switched on and off. Then, the transistor could be allowed to saturate. In that case, diode D1 and inductor L1 would not be needed, and the transistor would be controlled to regulate or saturate as needed.

Supply control circuit 80 typically includes a voltage control loop using an error amplifier (with compensation) or comparator to drive the regulating transistor, typically through buffer or gate driver circuitry. This could entail using level-shifters if needed to create proper voltages.

Figure 4A:
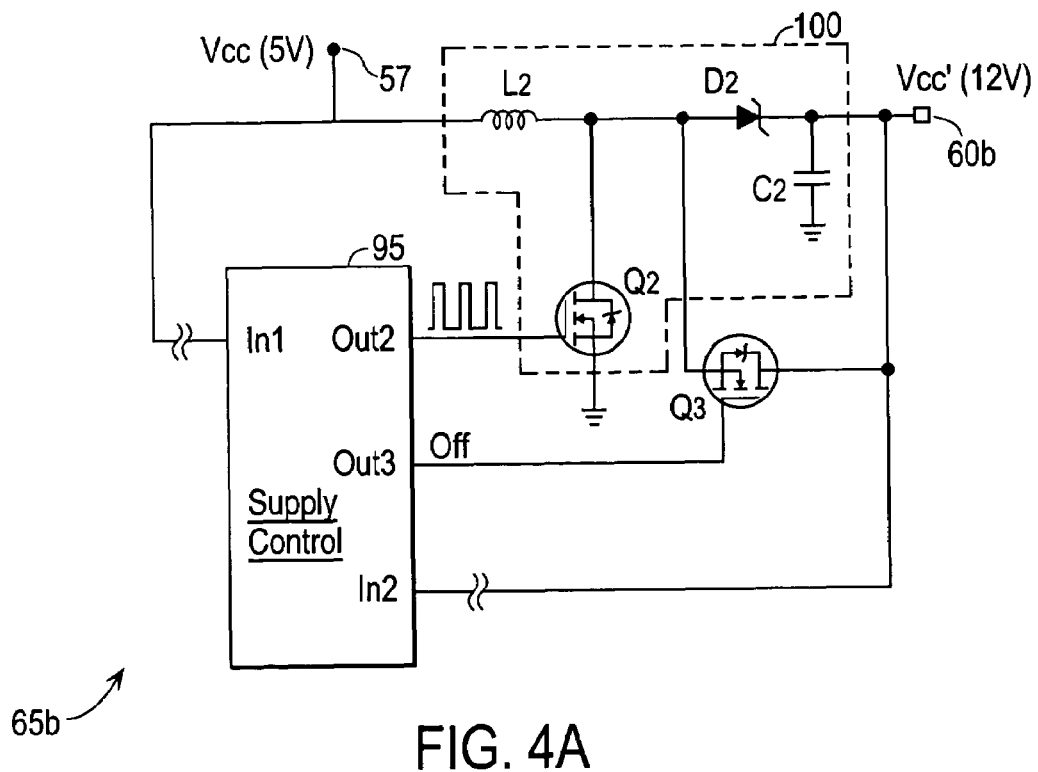
FIGS. 4A and 4B are circuit schematics of a second embodiment of a configurable power supply.
Figure 4B:
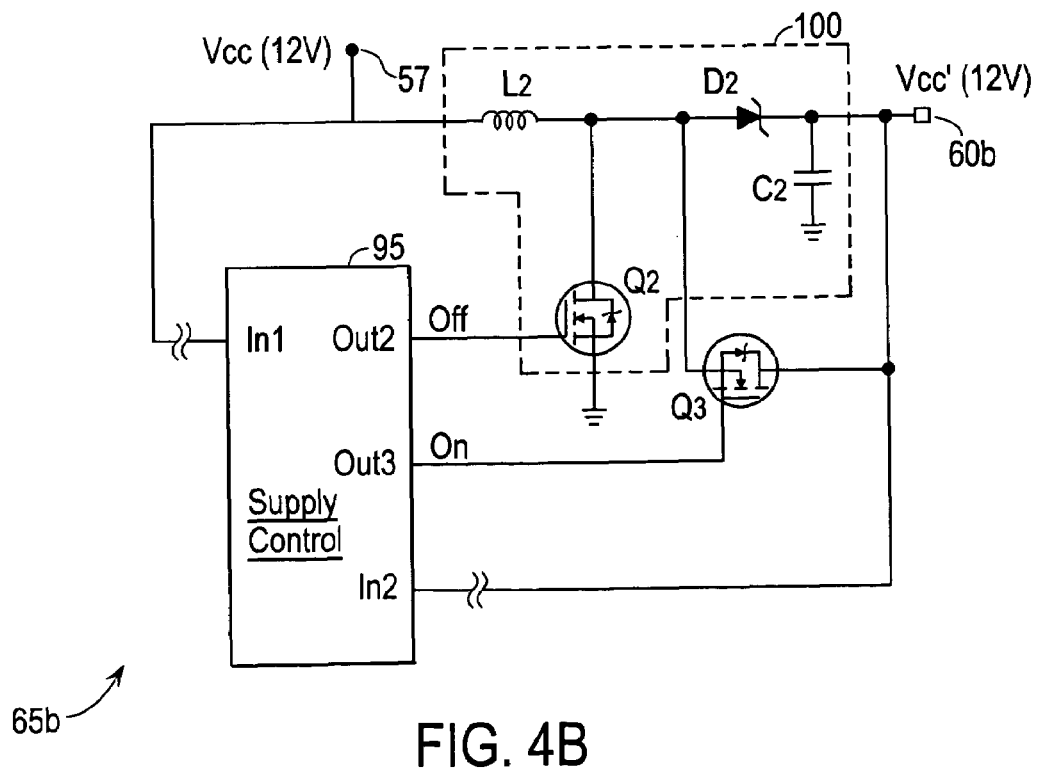

FIGS. 4A and 4B are circuit schematics of a configurable power supply 65b according to a second embodiment of the invention. In this embodiment, the configurable power supply is required to provide a 12-volt output on a voltage supply node 60b, regardless of whether the voltage at voltage supply node 57 is 5 volts or 12 volts. The configurable power supply includes a supply control circuit 95, a boost circuit 100, and one or more additional elements for providing a bypass path. The supply control circuit controls the boost circuit and the additional elements by providing appropriate signals at a pair of output terminals Out2 and Out3. Again, there is nothing fundamentally preventing passing Vcc through in addition to providing the 12-volt output if this might be desirable for a particular design.

Boost circuit 100 includes a transistor Q2, a diode D2, an inductor L2, and a capacitor C2. The additional elements include a transistor Q3. Inductor L2, diode D2, and capacitor C2 are connected in series between voltage supply node 57 (Vcc) and ground, with voltage supply node 60b (Vcc') being between diode D2 and capacitor C2. The drain of transistor Q2 is connected to the node between inductor L2 and diode D2, and the source is grounded. Output terminal Out2 is connected to the gate of transistor Q2. The source and drain of transistor Q3 are connected in parallel with diode D2, and output terminal Out3 is connected to the gate of transistor Q3. It should be noted that boost regulators can also be made with capacitors instead of inductors, so that the particular implementation is exemplary.

FIG. 4A shows the situation where the voltage at voltage supply node 57 (Vcc) is determined to be 5 volts. In this case, supply control circuit 95 drives its output terminal Out2, which is connected to the gate of transistor Q2, with a square wave on. The supply control circuit also provides an output on its output terminal Out3 that keeps transistor Q3 off during the boost operation. The result of the boost operation is the desired 12 volts at voltage supply node 60b. Alternatively, transistor Q3 can be run synchronously with transistor Q2 instead of charging capacitor C2 through diode D2.

FIG. 4B shows the situation where the voltage at voltage supply node 57 is determined to be 12 volts. In this case, supply control circuit 95 provides an output on its output terminal Out2 that keeps transistor Q2 off, and provides an output on its output terminal Out3 that keeps transistor Q3 on to act as a pass transistor and provide the 12-volt Vcc level on voltage supply node 60b.

As in supply control circuit 80 of FIGS. 3A and 3B, supply control circuit 95 has input terminals In1 and In2 to receive signals representing the state of the voltages at voltage supply node 57 (Vcc) and output voltage node 60b (Vcc'). As in FIGS. 3A and 3B, these are shown in the stylized representation suggesting the possibility that the connection may be direct or indirect.

Figures 5A, 5B:
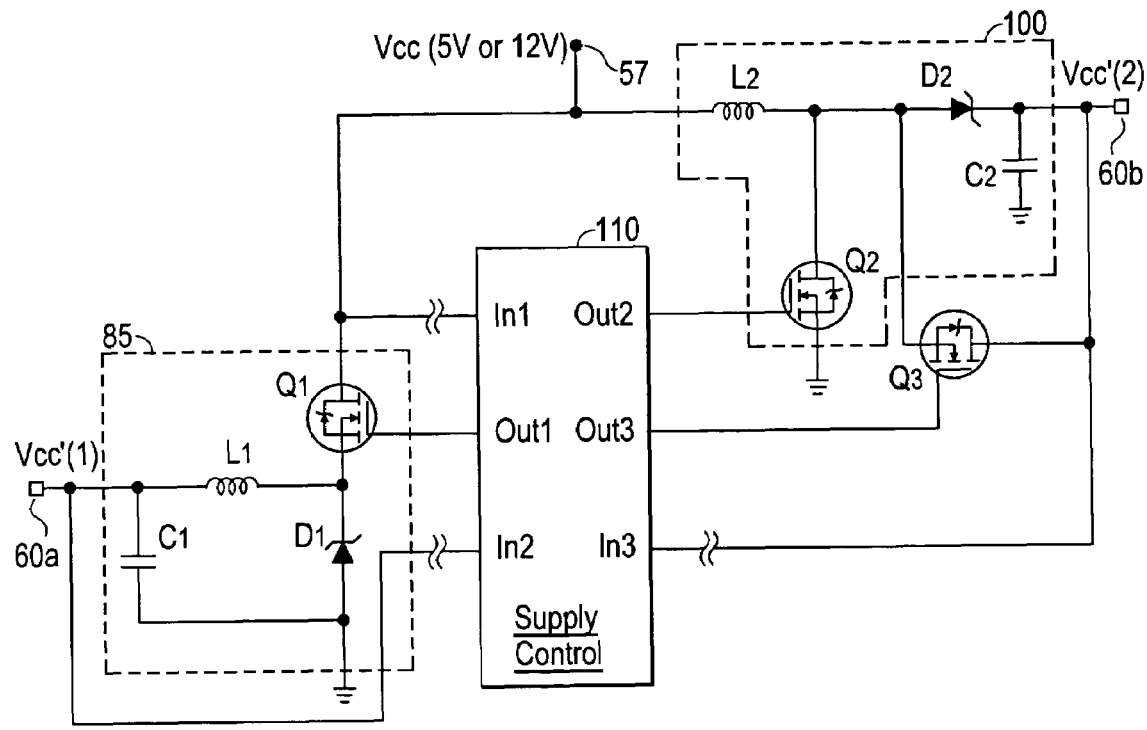
FIG. 5A is a circuit schematic of a third embodiment of a configurable power supply.
FIG. 5B is a table showing the control signals for various combinations of input supply voltage and output supply voltage for the embodiment of FIG. 5A.

FIG. 5A is a circuit schematic of a third embodiment of a configurable power supply 65c that provides both 5-volt and 12-volt outputs at a pair of output nodes 60a and 60b. Notice that the same reference numerals are used as are used for the output voltage nodes in FIGS. 3A-3B and 4A-4B since this embodiment incorporates the buck converter of FIGS. 3A and 3B and the boost converter of FIGS. 4A and 4B. In particular, configurable power supply 65c includes a supply control circuit 110 that has an output terminal Out1 that controls a buck converter that corresponds to buck converter 85 of FIG. 3A and has a set of outputs Out2 and Out3 that control a boost converter and other elements that correspond to boost converter 100 and the other elements shown in FIGS. 4A and 4B.

FIG. 5B is a table showing some of the possible sets of control signals that can be used to provide combinations of input and output supply voltages with configurable power supply 65c shown in FIG. 5A. This illustrates the possibility that the circuit could be configured to provide, for example, 5 volts at both Vcc' output nodes. Further, in some configurations, the circuit could provide different converted voltages at the different Vcc' output nodes, say stepping 5 volts at Vcc to 12 volts at output node 60b while stepping the 5 volts down to a lower voltage, say 3.3 volts at output node 60a. Similarly, the circuitry could be configured to provide a step up, even when Vcc is found to be 12 volts. For example, a voltage of 24 volts could provide more armature torque.

Figures 6A, 6B:
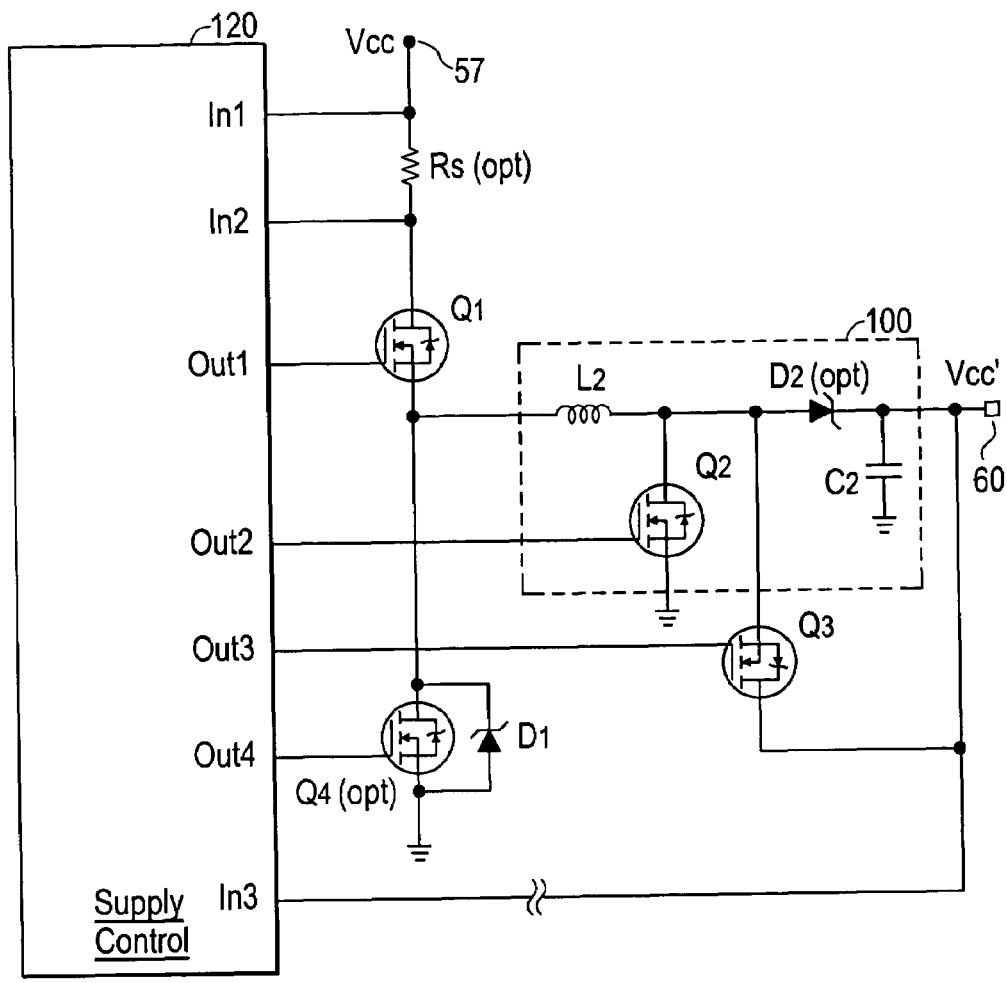
FIG. 6A is a circuit schematic of a fourth embodiment of a configurable power supply.
FIG. 6B is a table showing the control signals for various combinations of input supply voltage and output supply voltage for the embodiment of FIG. 6A.

FIG. 6A is a circuit schematic of a fourth embodiment of a configurable power supply 65d. This embodiment operates to regulate a single supply voltage Vcc up or down to a single output voltage Vcc'. The significance of this is that it potentially allows the host to provide an unregulated supply voltage subject to significant swings while providing the HDD a stable and more useful, regulated output voltage. This embodiment includes a supply control circuit 120, which controls three transistors Q1, Q2, and Q3 generally as in the embodiment of FIG. 5A, as well as an optional fourth transistor Q4. This embodiment differs from that of FIG. 5A in that while it includes provision for switching transistor Q1 for down-conversion and transistor Q2 for up-conversion, the circuitry shares inductor L2 and capacitor C2.

This embodiment also includes an optional current sensing resistor Rs in the path between Vcc and ground. This resistor provides a signal that is used by a loop in supply control circuit 120 that forces Vcc' to the desired output value regardless of current. Transistor Q4 cooperates with transistor Q1 during down-conversion. That is, during flyback recovery of diode D1, Q4 can be used to raise efficiency. It is not required, as diode D1 provides a recirculation path without transistor Q4, albeit at potentially higher voltage drops.

Transistor Q4 will be off to step-up the output voltage. In that step-up case, the optional transistor Q3 can be switched in a complementary fashion to Q2 to reduce losses that would otherwise be present in diode D2 during step-up conversion. So where Q3 or Q4 are stated to be "Off" in the table, that would be the equivalent of exercising the option not to use them. Likewise, where they are stated to be "Switching" in the table, the option to use them is exercised, and they would switch in a manner such that: [for step-down: (when transistor Q1 is on, transistor Q4 is off), and (when transistor Q1 is off, transistor Q4 is on)], and [for step-up: (when transistor Q2 is on, transistor Q3 is off), and (when transistor Q2 is off, transistor Q3 is on)]. Finally, transistor transistor Q3 could replace diode D2 during step-down and reduce voltage drops relative to diode D2. That is why the table shows Q3 as "On" in those cases (assuming it is present).

FIG. 6B is a table showing some of the possible sets of control signals for various combinations of input supply voltage and output supply voltage for the embodiment of FIG. 6A. The first row of the table shows the operation of the circuit when it is determined that Vcc<Vcc', indicating that up-conversion is needed. The second row of the table shows the operation of the circuit when it is determined that Vcc=Vcc', indicating that neither down-conversion nor up-conversion is needed. The third row of the table shows the operation of the circuit when it is determined that Vcc>Vcc', indicating that down-conversion is needed.

Additional Configuration and Control Aspects

Various embodiments of the invention are capable of providing one or more advantages, but it is not required that a given embodiment provide all the possible advantages, or even that it provide any of the advantages possibly provided by other embodiments. Some embodiments of the invention can provide flexibility, but others can be limited. For example, embodiments can be configured to limit use for only step-up (plugging a drive designed for mobile applications into larger host machines) or only step-down applications (plugging a drive designed for larger systems into mobile host machines). Flexibility with the power supply generation and/or distribution on the HDD in some embodiments can save host system power supply generation and/or distribution cost. For example, an embodiment could be designed to accept an "unregulated" Vcc supply (say 12 volts ±30%) and still perform reliably by adjusting its Vcc' voltage appropriately.

As mentioned above in connection with FIG. 2, configurable power supply 65 and power supply monitor 52 may communicate with other onboard logic and the host. While this is not necessary for many embodiments, additional functionality and improved performance of the HDD may be achieved though additional operations.

For example, the random access servo in the motor control circuitry can, to some degree, be reconfigured based on the available power supply voltage as determined by input power supply sensor 62. This allows for performance optimization to fit the power consumption specification for a wider range of applications. Seek power can be reduced at the expense of access time to save 5-volt battery power, or increased with higher consumption for performance applications.

Further, since current magnetic recording technology prohibits significant rotational speed changes, spindle motor control can be maintained to the required specification. One benefit from the perspective of the spindle motor control is that the same electromechanical system might be extended from mobile into desktop or server applications, since higher available voltage will allow a corresponding RPM increase. Conversely, a high-performance HDD may be used in a mobile application simply by rotating it at lower speed, possibly resulting from lower available supply voltage. This simply requires the motor controller technology to support the range of supply conditions expected.

The firmware resident on the HDD can be programmed to configure the supply sensing according to the design parameters of the product. Also, an arbitrary command set can be defined for the host system to use after initialization. These commands allow the host system to make certain configuration requests to the drive. An example might be to conserve power for a mobile application, or to maximize performance if it is a priority to the host.

The use of 5-volt and 12-volt supplies serves mainly as an example to match the most common existing external HDD supply voltages. In view of the configurable voltage regulation described above, it is possible to generate different voltages as required. For example, the embodiment of FIG. 5A could be configured to pass through an input 5-volt supply to Vcc'(2), or step the 5 volts up to 12 volts, and also to regulate the 5 volts to provide a different lower voltage, say 3.3 volts, to Vcc'(2). Thus, the core logic voltage may be scaled down as the technology requires, and the motor supply voltages may be set independently as desired for a given application. Such control may be established by setting up control nodes, resistor divider networks working in conjunction with an on-chip bandgap reference, and digital control registers.

CONCLUSION

In conclusion it can be seen that embodiments of the invention allow HDDs to operate in a broader range of applications. For example, by allowing a small form factor HDD to be compliant with single 12-volt and/or 5-volt external supplies, the drive can operate in desktop, mobile and/or automotive or other systems with flexibility and portability between DC power distribution schemes. Another potential benefit is that as form factors continue to shrink, a larger number of mechanical designs may be supported by an increasingly common set of electronics, which may provide additional economy of scale for the HDD circuit boards.

While the above is a complete description of specific embodiments of the invention, the above description should not be taken as limiting the scope of the invention as defined by the claims.

What is claimed is:

1. A circuit for sensing an input supply voltage and providing a desired output voltage, the circuit comprising:
   a voltage sensing circuit, configured to sense, at least at a predetermined time, a value of the input supply voltage and provide a voltage indication signal based on the supply voltage, so sensed;
   a control circuit, responsive to said voltage indication signal, that generates a control signal; and
   a switching element having a control terminal that receives said control signal;
   said control signal being different for different first and second values of said supply voltage, so sensed, wherein
      said first value of said supply voltage, so sensed, is different from said desired output voltage, and
      said control signal is in the form of a pulse train for switching said switching element for said first value of said supply voltage, so sensed, wherein said pulsed control signal has a duty cycle greater than 0% and less than 100%.

2. The circuit of claim 1 wherein said predetermined time is at power-on.

3. The circuit of claim 1 wherein said desired output voltage is used to power motors and logic in a hard disk drive.

4. The circuit of claim 1 wherein said first value of said sensed supply voltage is lower than said second value of said sensed supply voltage.

5. The circuit of claim 1 wherein:
   said second value of said sensed supply voltage is equal to said desired output voltage; and
   said control signal is in the form of a fixed level for said second value of said supply voltage, so sensed.

6. The circuit of claim 5 wherein said fixed level is such as to keep said switching element in an ON state.

7. The circuit of claim 5 wherein said fixed level is such as to keep said switching element in an OFF state.

8. The circuit of claim 1, and further comprising a second switching element having a control terminal, and wherein:
   said control circuit is further configured to provide a second control signal based on the supply voltage, so sensed, to said control terminal of said second switching element; and
   said second control signal is such as to maintain said second switching element in an ON state for one of said first and second values of said supply voltage and in an OFF state for the other of said first and second values of said supply voltage.

9. The circuit of claim 8, and further comprising a third switching element having a control terminal, and wherein:
   said control circuit is further configured to provide a third control signal based on the supply voltage, so sensed, to said control terminal of said third switching element; and
   said third control signal is a pulse train for switching said third switching element for one of said first and second values of said supply voltage, and a fixed level for the other of said first and second values of said supply voltage.

10. The circuit of claim 8, wherein the first control signal is output from a first output terminal of the control circuit and the second control signal is output from a second output terminal, and wherein the first control signal and the second control signal are different signals.

11. A chipset for a hard disk drive comprising: the circuit of claim 1; and
    a motor control circuit powered by said desired output voltage from said circuit.

12. A hard disk drive comprising:
    the circuit of claim 1;
    a magnetic disk;
    a spindle motor connected to said disk to rotate said disk upon the application of power;
    a head for reading and writing data from and to said disk;
    a head motor connected to move said head across said disk upon the application of power; and
    a motor control circuit coupled to said spindle motor and said head motor to control the application of power to said spindle motor and said head motor;
    at least one of said spindle motor, a head motor, and motor control circuit receiving power supplied by said circuit.

13. A circuit for powering a hard disk drive, the circuit comprising:
    a voltage sensing circuit, configured to sense, at least at a predetermined time, a single supply voltage at one input node and provide a voltage indication signal based on the supply voltage, so sensed;
    at least one DC-DC conversion circuit, connected to said one input node and to an output node, for converting said single supply voltage, so sensed, to a different desired output voltage when said single supply voltage sensed at the one input node is not the desired output voltage and providing said different voltage on said output node; and
    a control circuit, coupled to said voltage sensing circuit and to said DC-DC conversion circuit for controlling said DC-DC conversion circuit depending on said supply voltage, so sensed, wherein when the sensed single supply voltage is the desired output voltage, said control circuit controls the DC-DC conversion circuit to not convert the sensed single supply voltage to a different voltage so that said sensed single supply voltage is provided on said output node.

14. A circuit for powering a hard disk drive, the circuit comprising:
    a voltage sensing circuit, configured to sense, at least at a predetermined time, a single supply voltage at one input node and provide a voltage indication signal based on the supply voltage, so sensed;

at least one DC-DC conversion circuit, connected to said input node and to an output node, for converting said single supply voltage, so sensed, to a different desired output voltage and providing said different voltage on said output node;

a switchable pass-through path between said input node and said output node; and a control circuit, coupled to said voltage sensing circuit, said DC-DC conversion circuit, and said switchable pass-through path;

said control circuit controlling said DC-DC conversion circuit and said switchable pass-through path so that:
when said voltage indication signal indicates that said single supply voltage is different from said desired output voltage, said control circuit
enables said DC-DC conversion circuit to supply said different voltage on said output node, and
prevents said pass-through path from passing said supply voltage to said output node; and
when said voltage indication signal indicates that said supply voltage is equal to said desired output voltage, said control circuit
prevents said DC-DC conversion circuit from supplying said different voltage on said output node, and
allows said pass-through path to pass said supply voltage to said output node.

15. The circuit of claim 14 wherein said desired output voltage is greater than said voltage sensed at said input node.

16. The circuit of claim 14 wherein said desired output voltage is less than said voltage sensed at said input node.

17. The circuit of claim 14 wherein said DC-DC conversion circuit is a switching regulator.

18. The circuit of claim 14 wherein said control circuit prevents said DC-DC conversion circuit from supplying said different voltage on said output node by disabling said DC-DC conversion circuit.

19. The circuit of claim 14 wherein said DC-DC conversion circuit includes a switching element that is also located in said pass-through path.

20. A hard disk drive comprising:
a magnetic disk;
a spindle motor connected to said disk to rotate said disk upon the application of power;
a head for reading and writing data from and to said disk;
a head motor connected to move said head across said disk upon the application of power; and
a motor control circuit coupled to said spindle motor and said head motor to control the application of power to said spindle motor and said head motor;
power distribution circuitry for connection to a power source solely through a two-pin connection to the power source, said connection providing a supply voltage between a voltage supply node and a ground node, said power distribution circuitry including:
a voltage sensing circuit, configured to sense, at least at a predetermined time, said supply voltage and provide a voltage indication signal based on the supply voltage, so sensed;
at least one DC-DC conversion circuit, connected to said voltage supply node and to an output node, for converting said supply voltage, so sensed, to a different desired output voltage when said supply voltage sensed at the voltage supply node is not the desired output voltage and providing said different voltage on said output node; and
a control circuit, coupled to said voltage sensing circuit and to said DC-DC conversion circuit for controlling said DC-DC conversion circuit depending on said supply voltage, so sensed, wherein when the sensed supply voltage is the desired output voltage, said control circuit controls the DC-DC conversion circuit to not convert the sensed supply voltage to a different voltage so that said sensed supply voltage is provided on said output node.

21. The circuit of claim 20 wherein:
said voltage supply node is at 5 volts;
at least one component of said hard disk drive requires a voltage greater than 5 volts; and
said DC-DC conversion circuit includes a switching regulator that converts 5 volts to a higher voltage.

22. The circuit of claim 20 wherein:
said voltage supply node is at 12 volts;
no components of said hard disk drive require a voltage greater than a predetermined voltage that is less than 12 volts; and
said DC-DC conversion circuit includes a switching regulator that converts 12 volts to a voltage that is less than 12 volts.

23. The circuit of claim 20 wherein:
said voltage supply node is at 12 volts;
no components of said hard disk drive require a voltage greater than a predetermined voltage that is less than 12 volts; and
said DC-DC conversion circuit includes a linear regulator that converts 12 volts to a voltage that is less than 12 volts.

* * * * *